UNITED STATES PATENT OFFICE.

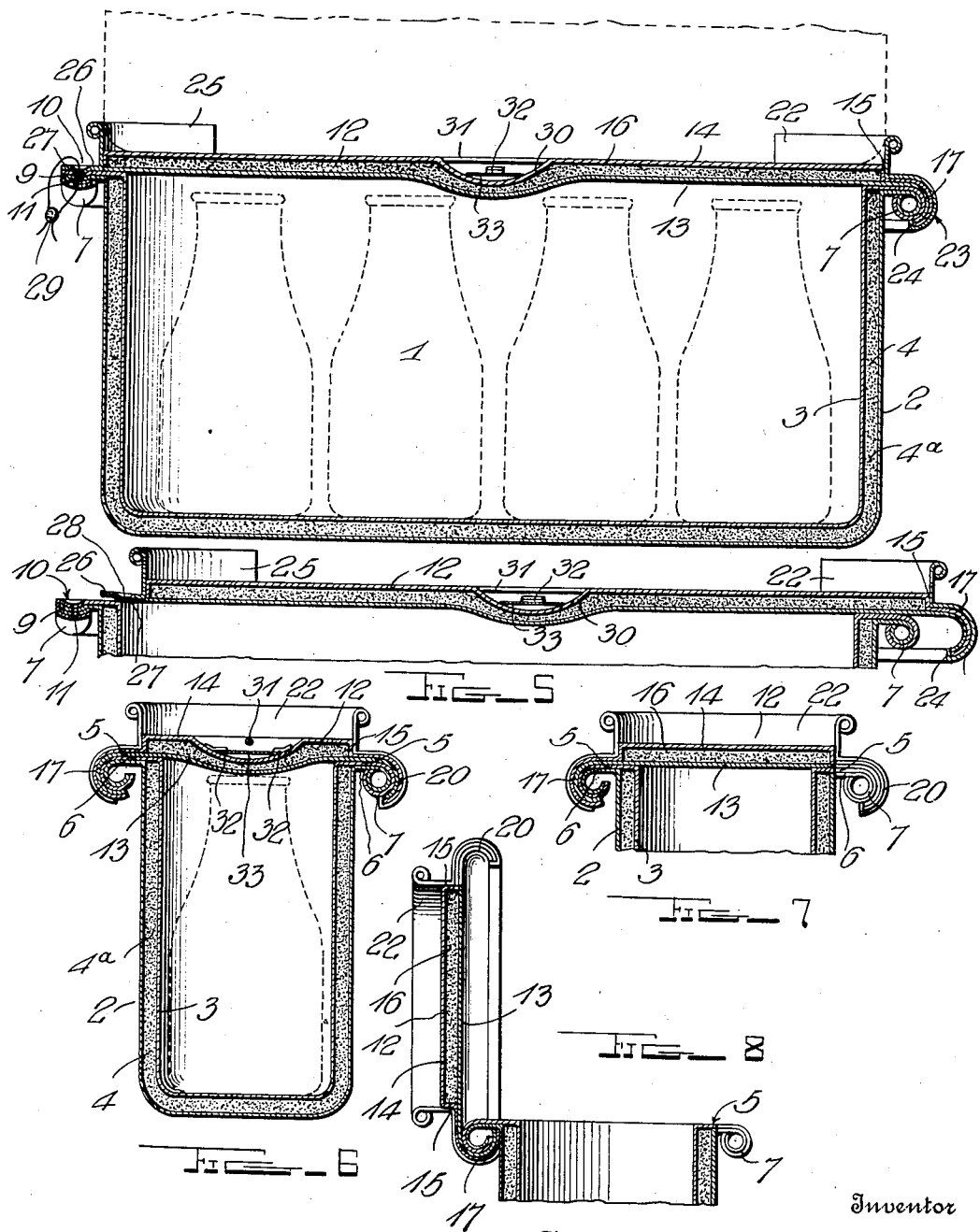

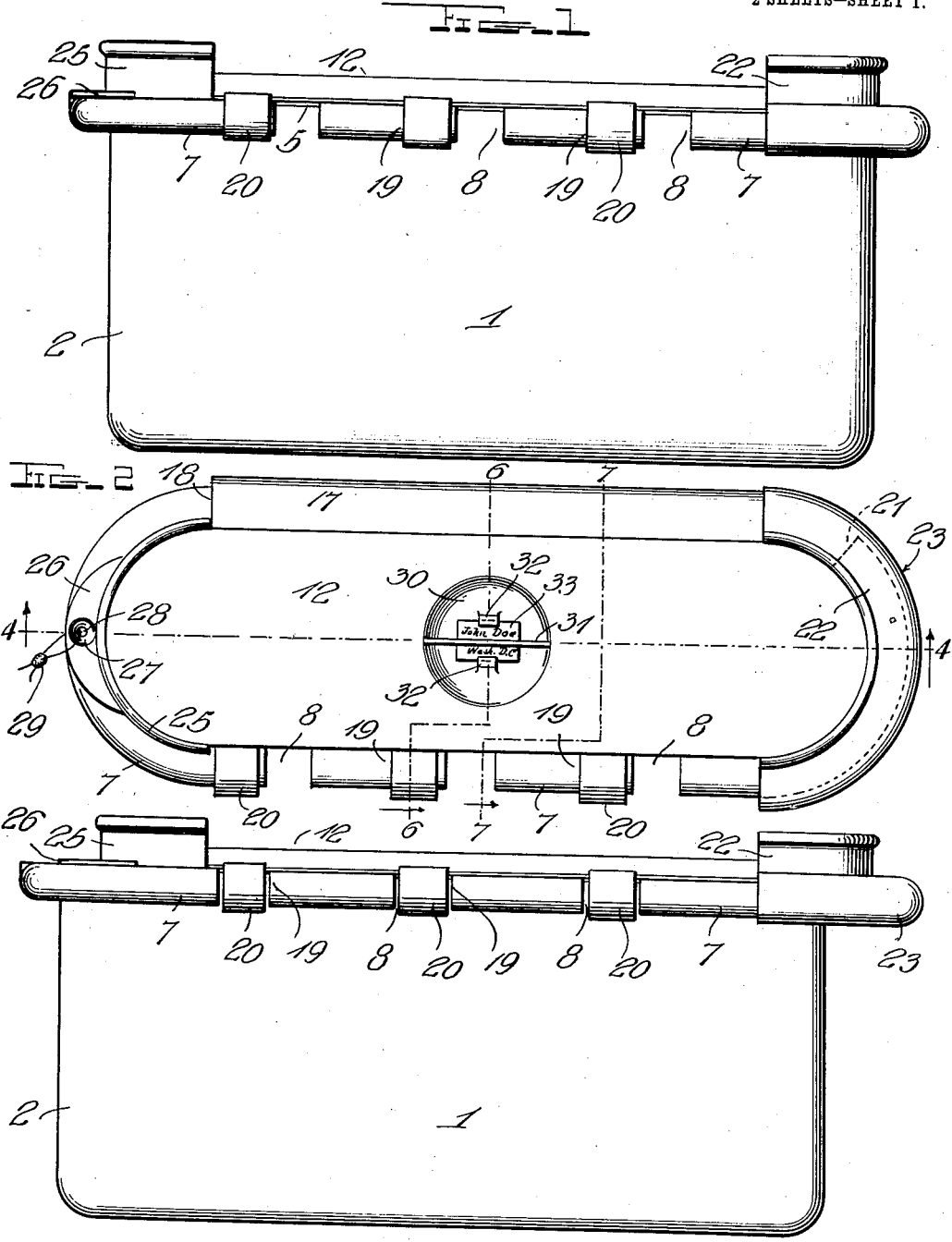

GUSTAV G. LOEHLER, OF WASHINGTON, DISTRICT OF COLUMBIA.

SANITARY INSULATED RECEPTACLE.

1,112,709.  Specification of Letters Patent.  Patented Oct. 6, 1914.

Application filed June 18, 1913. Serial No. 774,413.

*To all whom it may concern:*

Be it known that I, GUSTAV G. LOEHLER, a citizen of the United States, residing at Washington, in the District of Columbia, have invented certain new and useful Improvements in Sanitary Insulated Receptacles; and I do declare the following to be a full, clear, and exact description of the invention, such as will enable others skilled in the art to which it appertains to make and use the same.

This invention relates to improvements in sanitary insulated receptacles and particularly to receptacles for holding and delivering bottles of milk.

One object of the invention is to provide a receptacle of the class described having an improved construction and arrangement of cover and means for hinging and fastening the same to the body of the box whereby a substantially air-tight closure is provided and which will effectually protect the contents from contamination and from being tampered with by unauthorized persons.

Another object is to provide a receptacle for milk bottles and the like having insulated walls whereby the temperature within the receptacle is maintained for a considerable period of time, thus preserving the contents thereof.

With these and other objects in view, the invention consists of certain novel features of construction, and the combination and arrangement of parts as will be more fully described and claimed.

In the accompanying drawing: Figure 1 is a front side view of my improved receptacle showing the cover in closed and fastened position; Fig. 2 is a top plan view thereof; Fig. 3 is a view similar to Fig. 1 showing the cover closed but slipped back in position to be swung open; Fig. 4 is a central vertical section of the receptacle taken on the line 4—4 of Fig. 2 and showing the cover of the box entirely closed and locked in closed position; Fig. 5 is a similar view showing the cover of the receptacle slipped back to the position shown in Fig. 3; Fig. 6 is a vertical cross section of the receptacle taken on the line 6—6 of Fig. 2; Fig. 7 is a similar view of the upper portion of the receptacle taken on the line 7—7 of Fig. 2; Fig. 8 is a similar view showing the cover swung upwardly to an open position.

My improved receptacle comprises a body 1 which may be of any suitable size and shape and constructed of any suitable material the same being here shown as being of oblong shape with its ends rounded or semi-circular. The body 1 comprises an outer shell 2 and an inner shell 3 which is separated a suitable distance from the outer shell to form a space 4 which is preferably filled with a suitable non-conducting or insulating packing 4ª or from which the air may be drawn to form a vacuum between the two shells of the body. The packed or vacuum space between the shells 2 and 3 of the body will effectually retain the temperature within the body for a considerable length of time, thus preserving the contents of the receptacle. The lower corners of the sides and ends of the inner and outer shells 2 and 3 of the receptacle are preferably rounded as shown thus facilitating the cleaning of the receptacle and preventing the accumulation of foreign matter in the corners of the inner shell and which will also facilitate the nesting or engagement of one receptacle with the cover of the next lower receptacle when the latter are piled in stacks as will be hereinafter described.

The upper edges of the inner and outer receptacles are bent outwardly at right angles to form flanges 5 and 6. The flange 5 of the inner shell forms an air-tight engagement with the flange 6 of the outer shell of the receptacle and the engagement of the flange 5 with the flange 6 supports the inner shell and holds the latter in spaced relation to the outer shell as shown. The edges of the flanges 5 and 6 are turned or bent inwardly to form a substantially cylindrical roll 7 which extends entirely around the sides and ends of the receptacle as shown. The roll formed by the inwardly turned edges of the flanges 5 and 6 along the front side of the receptacle is cut away at intervals to form spaces or openings 8, the purpose of which will be hereinafter described. The roll 7 on one end of the receptacle is flattened at the center of said end as shown at 9 and said flattened portion of the roll has in its upper side a recess or depression 10 and in the center of which and through the flattened portion of the roll is formed a passage 11 the purpose of which and of the depression 10 will be hereinafter described. The roll 7 on the opposite end of the receptacle and along the rear side thereof is continuous and the roll on the rear side of the box forms one member of a hinge connection for the top of the box, while the roll at the end thereof forms part of the fastening for the cover when the latter is shifted to a full closed position.

The cover 12 of the receptacle comprises an inner plate 13 and an outer plate 14 which is separated a suitable distance from the inner plate preferably by turning down the edges of the outer plate as shown at 15 thus forming between said outer and inner plates a space 16 which is adapted to contain a suitable non-conducting packing or from which the air may be drawn to form a vacuum. The edges of the inner plate 13 of the cover are designed to rest on the outwardly projecting flange 5 of the inner shell of the receptacle and the edge of the outer plate 14 after being turned down to space the latter from the plate 13 has a fluid tight engagement with the edge of the lower plate, and said edges of the upper and lower plates are extended and curved downwardly and inwardly to form substantially semi-circular flanges 17 which are continuous along the rear side of the cover and around one end thereof. At the opposite end of the cover the flanges 17 terminate or are cut away opposite the center of the rounded end as shown at 18. Along the front side of the cover the flanges 17 are recessed or cut away at intervals as shown at 19 to form a series of curved fastening lugs 20 which, when the cover is in a full closed position are engaged with the sections of the roll 7 along the front side of the receptacle between the notches 8 as shown in Fig. 2 of the drawings and which when the cover is shifted or slipped back for the purpose of swinging the same to an open position, engage said recesses 8 as clearly shown in Fig. 3 of the drawings. When the cover has thus been shifted to bring the lugs 20 opposite to the notches 8 the flange on the end of the cover will have been disengaged from the roll on this end of the receptacle, so that the cover when in this position may be swung upwardly or opened as shown in Fig. 7 of the drawings. In thus opening the cover the engagement of the flange on the rear side thereof with the roll on the rear side of the receptacle forms a hinge which permits the cover to be swung upwardly in the manner described. In order to permit the cover to be swung upwardly after being shifted in the manner described it will be necessary to notch out the roll 7 at the rear side and end of the receptacle with which the flange on the rear and end edges of the cover is engaged or at the point where the lower edge of the rear flange of the cover engages the rear portion of the adjacent end flange of the receptacle, as shown in dotted lines in Fig. 2 of the drawings.

Arranged on the projecting edge of the upper plate 14 of the cover and engaged with the offset curved end thereof is an upwardly projecting substantially semi-circular plate 22 the upper edge of which is turned outwardly to form a bead, while the lower edge is bent outwardly at right angles and curved to fit the projecting edge and flange 17 of this end of the cover as shown at 23. The outwardly projecting curved lower portion 23 of the plate 22 has its edge bent upwardly and engaged with the edges of the flange 17 of the cover as shown at 24. This arrangement of the lower portion of the plate 22 reinforces and rigidly braces the curved end flange 17 of the cover, while the portion of the plate 22 which projects above the cover forms a handle which may be employed for opening the cover of the receptacle. At the opposite end of the cover is secured a curved plate 25 which corresponds with the plate 22 and projects above the cover to form a handle for closing the cover. The plate 25 is secured to the offset portion of the upper plate 14 of the cover, but is not provided on its lower edge with an outwardly extending curved flange 23 as is the plate 22, said plate 25, however, having on its lower edge opposite to the center of the end of the cover a longitudinally extending segmental flange 26 having therein a centrally disposed depression which forms a detent 27 and which is adapted to spring into engagement with the recess or indentation 10 in the flattened portion of the roll 7 on this end of the body of the receptacle. The detent 27 has therein a centrally disposed aperture 28 which, when the detent is engaged with the recess 10 will register with the passage 11 in the flattened portion of the roll and is designed to receive a seal 29, padlock, or other fastening device by which the cover may be securely fastened or locked on the receptacle to prevent the contents of the latter from being tampered with by unauthorized persons.

In the center of the cover the inner and outer plates thereof are depressed to form a circular recess 30 across the upper portion of which and having its ends secured to the upper edge of the depressed portion of the upper plate is a longitudinally extending handle bar 31, which may be grasped by inserting the fingers beneath the same and the bottom of the depression 30, thus facilitating the carrying of the receptacle. If desired the box may be provided with a suitable means for holding a tag or card containing the name and address of the party to whom the receptacle is consigned, said tag holder being herein shown as preferably consisting of lips or short lugs 32 which are fastened on or formed from the depressed portion of the upper plate of the cover as clearly shown in Figs. 2, 4, 5 and 6 of the drawings and beneath which the card or tag 33 containing the name and other desired information is inserted and firmly held in position to prevent the card from being torn or defaced. The upwardly projecting portions of the plates 22 and 25 aside from forming handles for conveniently shifting the cover also provide stop flanges to receive the lower portion of the next upper receptacle when the latter are stacked or placed one above the other while being carried out for delivery or when stored or shipped.

The receptacle shown in the accompanying drawings is arranged to receive four milk bottles or jars, it will be obvious however that the receptacle may be constructed of any desired size to contain any desired number of bottles and while herein shown and described as being designed particularly for holding and delivering milk bottles in a cool, clean, sanitary condition and for protecting the bottles from being tampered with by unauthorized persons it is obvious that the receptacle may be employed as a container and delivering receptacle for other goods.

It will be noted that the curved upstanding plates 22—25 at the ends of the cover are provided primarily for the purpose of enabling the receptacles to be stacked or superimposed upon each other so that they will not shift longitudinally or transversely when in a wagon or when a number of them are being carried by hand. A number of the receptacles may be readily carried by hand when superimposed and they may be carried equally as well in racks or crates provided for that purpose. These racks may be of suitable size and shape to hold any desired number of receptacles of various sizes and the receptacles may be placed one upon another in the different compartments of the rack or crate according to its dimensions. The curved upstanding stop plates also serve as handles since either one may be readily grasped to slide the cover longitudinally on the body of the receptacle to locked or unlocked position. Furthermore said stop plates 22—25 materially strengthen and reinforce the ends of the cover and likewise the receptacle so as to provide an exceedingly rigid and durable structure. It will be further noted that there is a slight space between the rolls or beads on the body of the receptacle and the side walls of the receptacle and this space enables such rolls or beads to be readily engaged with spaced hooks on a wall or other upright support so that the receptacle may be hung up instead of being set flat upon the floor.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

1. A receptacle of the class described having a cylindrical roll on one end and one side thereof, and longitudinally spaced roll sections on the other side, a cover for said receptacle having a semi-circular roll at one side and one end for slidable engagement with the roll at the corresponding end and side of the receptacle, the coöperating roll at the side of the cover and receptacle being adapted for pivotal movement when in a predetermined position, longitudinally spaced semi-circular roll sections on the other side of said cover positioned to slidably engage the roll sections of the other side of the receptacle, and means at the other end of said cover and receptacle for securing said members together in closed position.

2. A receptacle of the class described having a cylindrical roll on one end and one side thereof and longitudinally spaced roll sections on the other side, a cover for said receptacle having a semi-circular roll at one side and one end for slidable engagement with the roll at the corresponding end and side of the receptacle, the coöperating roll at the side of the cover and receptacle being adapted for pivotal movement when in a predetermined position, longitudinally spaced semi-circular roll sections on the other side of said cover positioned to slidably engage the roll sections of the other side of the receptacle and shorter than said roll sections to adapt them when the cover is moved in one direction to be disengaged from said roll sections, said cover being slidable longitudinally relative to said receptacle for engaging and disengaging the roll sections and semi-circular roll sections of the two members, whereby the cover may be closed or opened.

3. A receptacle of the class described comprising inner and outer spaced shells provided at their upper edges with outwardly extending flanges, the flange of one shell forming air tight engagement with the flange of the other shell, said flanges performing the double function of supports for the inner shell and as means for spacing said shells, the flanges of the two shells being turned inwardly to form a substantially cylindrical roll extending around the sides and ends of the receptacle, said roll having longitudinal spaces or recesses formed therein at one side of the receptacle, a cover for said receptacle having a semi-circular flange continuous along one side and around one end thereof and adapted to engage the roll at the corresponding side and end of the receptacle the opposite side of said cover having longitudinally spaced down curved fastening lugs adapted to slidably engage the roll sections formed by the openings at the front of the receptacle.

4. The combination with a receptacle having a cylindrical roll on one end thereof, of a cover having a semi-cylindrical roll at one end for engagement with the roll of said receptacle and an upwardly extending flange on the end of said cover having the roll, said flange having at its lower or inner edge an extension shaped to fit the cover roll, the free edge of said extension being bent upon the edge of the semi-cylindrical roll of the cover to form a re-inforce and brace for said roll.

5. The combination with a receptacle having a cylindrical roll on one end thereof, of a cover composed of inner and outer shells spaced apart by an offset formed at the edge of said outer shell, said shells having semi-circular flanges at one end bent to form a semi-cylindrical roll, plates extending at right angles from the ends of said cover and arranged in engagement with the off-set portion of said outer shell, one of said plates having an extension at its lower edge shaped to encircle the roll on said cover and provide a re-inforce and brace therefor.

In testimony whereof I have hereunto set my hand in presence of two subscribing witnesses.

GUSTAV G. LOEHLER.

Witnesses:
J. E. SCHRIDER,
G. W. GIOVANNETTI.